United States Patent
Jovicic et al.

(10) Patent No.: US 8,078,111 B2
(45) Date of Patent: Dec. 13, 2011

(54) METHODS AND APPARATUS FOR USING MULTIPLE FREQUENCY BANDS FOR COMMUNICATION

(75) Inventors: Aleksandar Jovicic, Urbana, IL (US); Junyi Li, Bedminster, NJ (US); Rajiv Laroia, Far Hills, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 12/195,663

(22) Filed: Aug. 21, 2008

(65) Prior Publication Data
US 2010/0029216 A1 Feb. 4, 2010

Related U.S. Application Data

(60) Provisional application No. 61/084,560, filed on Jul. 29, 2008.

(51) Int. Cl.
*H04B 1/00* (2006.01)
*H04B 15/00* (2006.01)

(52) U.S. Cl. ...... 455/63.1; 455/450; 455/69; 455/67.11; 455/67.13; 455/509; 370/335; 370/254; 370/338; 370/350; 709/228

(58) Field of Classification Search ................ 455/63.1, 455/450, 69, 67.11, 67.13, 509; 370/335, 370/254, 338, 350, 324, 431; 709/228
See application file for complete search history.

(56) References Cited

U.S. PATENT DOCUMENTS

| | | | | |
|---|---|---|---|---|
| 5,884,196 | A | * | 3/1999 | Lekven et al. ................ 455/574 |
| 7,164,930 | B2 | | 1/2007 | Korneluk et al. |
| 7,313,120 | B2 | * | 12/2007 | Ekberg et al. ................ 370/338 |
| 7,342,895 | B2 | * | 3/2008 | Serpa et al. ................... 370/254 |
| 7,502,624 | B2 | * | 3/2009 | Rasanen ...................... 455/552.1 |
| 7,570,615 | B2 | * | 8/2009 | Bolin et al. ................... 370/329 |
| 7,603,594 | B2 | * | 10/2009 | Inoue et al. ................... 714/712 |
| 7,706,822 | B2 | * | 4/2010 | Emeott et al. ................ 455/502 |
| 7,809,835 | B2 | * | 10/2010 | Reunamaki et al. .......... 709/227 |
| 2005/0020262 | A1 | * | 1/2005 | Kim ........................... 455/435.1 |
| 2005/0117525 | A1 | * | 6/2005 | Poustchi et al. .............. 370/254 |
| 2006/0013160 | A1 | * | 1/2006 | Haartsen ...................... 370/328 |
| 2007/0217411 | A1 | * | 9/2007 | Danzeisen et al. ............ 370/389 |

FOREIGN PATENT DOCUMENTS
GB 2390510 1/2004

OTHER PUBLICATIONS

International Search Report & Written Opinion—PCT/US2009/051873, International Search Authority—European Patent Office—Sep. 6, 2010.

* cited by examiner

*Primary Examiner* — Marceau Milord
(74) *Attorney, Agent, or Firm* — Peng Zhu; James K. O'Hare

(57) ABSTRACT

Methods and apparatus for using different frequency bands are described. In some embodiments a first frequency band which is a licensed spectrum frequency band is used for peer discovery, device authentication, session establishment between peer devices and/or supporting an ongoing communications through control signaling. When available, a second frequency band, e.g., an unlicensed public frequency band is used for communicating data while the communications session is maintained using one or more control signals communicated in the first frequency band. Data and control signaling may be performed on a time division basis during a time period in which data is communicated.

23 Claims, 8 Drawing Sheets

| FIGURE 7A |
| FIGURE 7B |

US 8,078,111 B2

METHODS AND APPARATUS FOR USING MULTIPLE FREQUENCY BANDS FOR COMMUNICATION

RELATED APPLICATIONS

The present Application for Patent claims the benefit of U.S. Provisional Application No. 61/084,560 entitled "METHODS AND APPARATUS FOR USING MULTIPLE FREQUENCY BANDS FOR COMMUNICATION" filed Jul. 29, 2008, and assigned to the assignee hereof and is hereby expressly incorporated by reference herein.

FIELD

Various embodiments relate to wireless communications, and more particularly, to methods and apparatus related to using multiple frequency bands for communication.

BACKGROUND

Licensed spectrum, also sometimes called private spectrum because the spectrum is controlled by a private entity who purchased the license to use the spectrum, is normally a costly resource given the current high price of wireless spectrum licenses. Accordingly, for cost and potentially bandwidth availability reasons it may be desirable to avoid or minimize the use of licensed spectrum.

Publicly accessible spectrum, e.g., spectrum which may be used by the public for WiFi communications, may be free to the public. However, given that the spectrum is publicly accessible, it may be subject to heavy use and/or interference. Depending on location, interference and other factors including load, publicly accessible spectrum may not be reliable at some time and/or locations but may be capable of supporting relatively high data rates at other time and locations.

While cost and potential bandwidth make publicly available spectrum attractive for some applications, reliance on it may be unsuitable for applications where reliable communications are to be supported in a predictable manner.

In view of the above discussion, it should be appreciated that it would be desirable if methods and/or apparatus could be developed which could take advantage of the reliability of licensed spectrum while offering the cost and/or throughput advantages sometimes available through the use of publicly accessible spectrum.

SUMMARY

Figure 1:
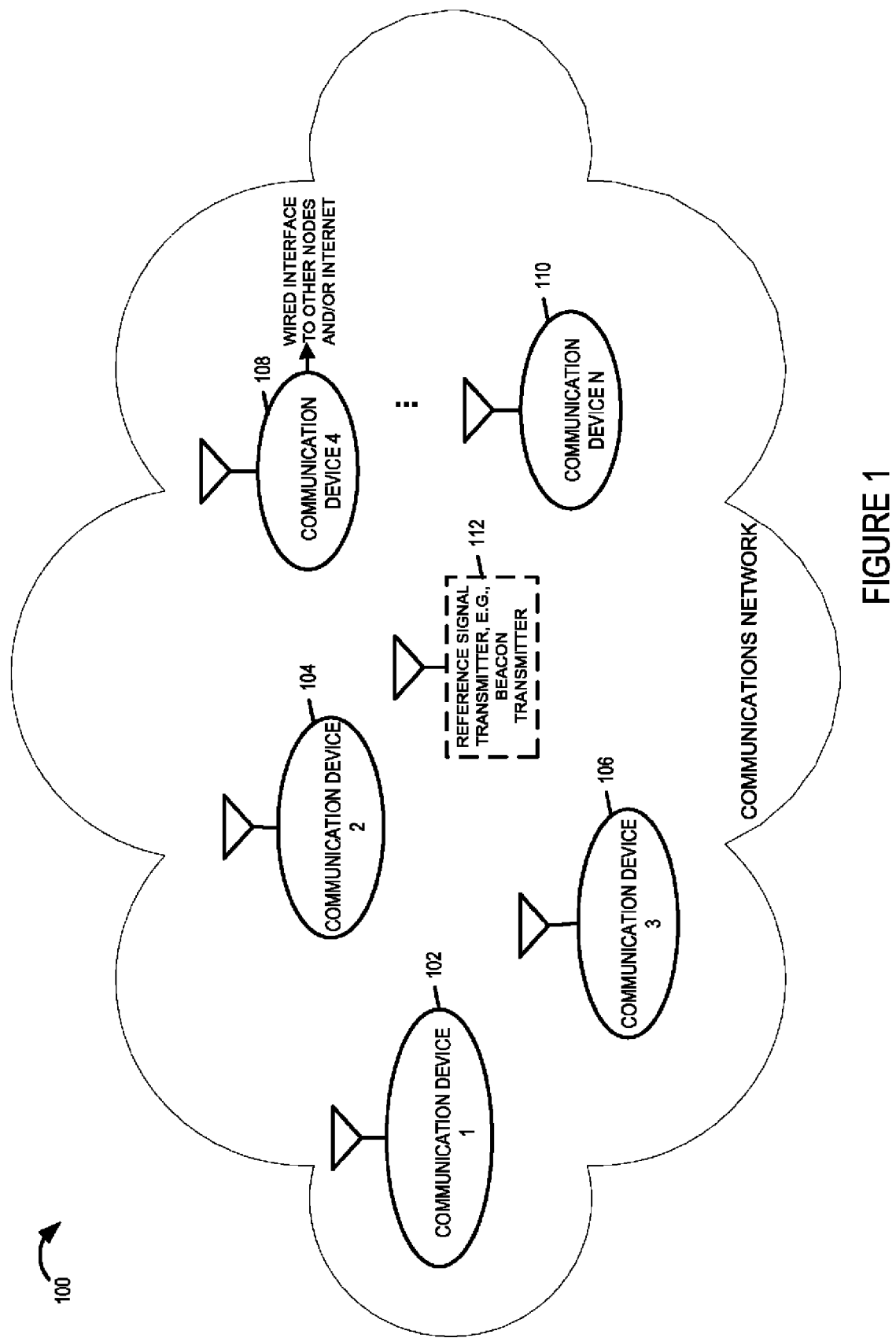
FIG. 1 is a drawing of an exemplary communications network in accordance with an exemplary embodiment.

Methods and apparatus for using different frequency bands are described. In some embodiments a first, e.g., licensed, frequency band, is used in combination with one or more additional frequency bands. The one or more additional frequency bands may include, for example, a publicly accessible frequency band. Given that the first frequency band is a licensed frequency band, access can be limited by the spectrum license holder and a level of service can be provided that may not be achievable using a public frequency band, e.g., a frequency band used for WiFi communications, since the public frequency band may be subject to high loads or interference due to other users. The first frequency band, in some embodiments, is used for presence signaling to enable discovery of or by other devices also permitted to use the first frequency band. Session establishment and control signaling may be implemented in the first frequency band. Devices which initiate a communications session in the first frequency band can check whether a second frequency band is available, e.g., for data communications. If the second, e.g., public, frequency band is available, the devices in the communications session may proceed to exchange signals in the first frequency band and to establish a data exchange in the second frequency band. In this manner, when a public frequency band is available, it may be used for data communications thereby limiting the load and utilization of the more costly first frequency band. Given that the second frequency band may be somewhat unreliable, while a data session is occurring in the second frequency band at least a certain level of control signaling is maintained in the first, e.g., more reliable, frequency band. In cases where an access terminal includes multiple receiver and transmitter processing chains, the exchange of control signals in the first frequency band may occur simultaneously with the exchange of data signals in the second frequency band. In other embodiments, e.g., time division multiplexed embodiments, communications of control signals in the first frequency band may occur on a time division multiplexed basis during the data session occurring in the second frequency band. Thus, it should be appreciated that at least in some embodiments, data signaling in second frequency band and control signaling in the 1st band may occur in TDM manner. In some such embodiments, control signals corresponding to the first frequency band are interspaced between data signals transmitted in the second frequency band during an interval in which an ongoing data session or exchange is occurring in the second frequency band.

In the case where multiple frequency bands may be available, the devices participating in a communications session may check multiple bands and then select one for data transmission.

In some embodiments the bandwidth of the 2nd band is greater than that of 1st band. In some embodiments, the first band is used for peer to peer signaling and communications while 2nd band is used for wireless Wide Area Network (WAN) signaling. Data transmission may be implemented in the first frequency band using a non-WiFi protocol while in some embodiments data exchange is implemented in the second frequency band using a WiFi communications protocol.

In addition to peer discovery and peer to peer session establishment, the first frequency band may be used for device authentication, e.g., as part of a session establishment process. In embodiments where the first frequency band is a licensed frequency band, this has the advantage of adding an additional level of security simply by the fact that the licensed frequency band is likely to be more reliable for communications than a publicly accessible frequency band. A licensed first frequency band is less likely to be open to other devices and/or may involve use of a communications protocol which is different from, and not supported by, many devices which may support the communications protocol, e.g., WiFi, used in the second communications band.

When a second frequency band is not available or is unreliable, the first frequency band may be used for data communications. In this manner, a device capable of communicating in both a private and public communications band can make the most cost effective use of the available spectrum and move data transfers, to the extent possible, to the frequency band which is the most cost effective without losing the ability to communicate in a reliable and relatively secure manner as made possible by having access to the licensed, e.g., private, frequency band used for sending and receiving one or more control signals, e.g., between peer to peer devices seeking to establish a communications session. In some embodiments the first frequency band is a licensed frequency band which is used for cellular telecommunications in addition to authorized peer to peer communications.

Some embodiments are directed a method of operating a first communications device where the method includes establishing, during a first time interval, a communications link between said first communications device and a second communications device using a first frequency band; communicating data between said first communications device and said second communications device using a second frequency band in a second time interval following said first time interval, said first and second frequency bands being non-overlapping frequency bands; and communicating a control signal between said first and second devices using said first frequency band during said second time interval. In some embodiments a first protocol is used to communicate in the first frequency band and a second communications protocol is used to communicate in the second frequency band. The first protocol may be, e.g. a non-WiFi protocol and the second protocol a WiFi protocol. In some embodiments the first frequency band is a private licensed frequency band and the second frequency band is an unlicensed frequency band which is publicly accessible.

In some embodiments, the method includes, prior to communicating data using said second frequency band, determining if said second frequency band is available for data communication; and communicating to said second communication device, using said first frequency band, that said second band is to be used for communicating data. In addition the method may include, prior to communicating to said second communications device that said second band is to be used for communicating data, instructing the second device to check the availability of the second band; and receiving from the second communications device information indicating the availability status of the second frequency band. Determining the availability of the second frequency band may include measuring an interference level present in the second frequency band; and making said availability determination as a function of the measured interference level. The interference level may, and in some embodiments is, one of: i) a received interference power level and ii) measured load level. In some, but not necessarily all, implementations of the method, establishing a communications link includes: transmitting, in said first frequency band, a peer discovery signal indicating the presence of said first communications device; and receiving a page signal indicating that the second communications device is seeking to establish a communications link with said first communication device. Establishing a communications link may include performing an authentication operation using signals exchanged in said first frequency band. In some but not necessarily all embodiments establishing a communications link includes receiving, in said first frequency band, a peer discovery signal indicating the presence of said second communications device and transmitting a page signal indicating that the first communications device is seeking to establish a communications link with said second communication device.

An exemplary first communications device, in accordance with some embodiments, comprises: a link establishment module configured to establish, during a first time interval, a communications link with a second communications device using a first frequency band; a data communications module configured to control said first communications device to communicate data between said first communications device and said second communications device using a second frequency band in a second time interval following said first time interval, said first and second frequency bands being non-overlapping frequency bands; and a control signal communications module configured to control said first communications device to communicate a control signal between said first communications device and said second communications device using said first frequency band during said second time interval.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

FIG. 1 is a drawing of an exemplary communications network 100 in accordance with an exemplary embodiment. Network 100 includes a plurality of frequency bands including a licensed spectrum frequency band and a publicly accessible spectrum frequency band. Exemplary communications network includes a plurality of communications devices (communications device 1 102, communications device 2 104, communications device 3 106, communications device 4 108, . . . , communications device N 110) supporting a first communications protocol, e.g., a non-WiFi communications protocol, for use in a first communications band and a second communications protocol, e.g., a WiFi communications protocol for use in a second communications band. Wireless communications devices (102, 104, 106, 110) are, e.g., mobile wireless terminals supporting peer to peer signaling. Wireless communications device 108, e.g., a stationary or mobile wireless terminal supporting peer to peer communications, also includes a wired interface allowing device 108 to be coupled to other network nodes and/or the Internet via a backhaul. In some embodiments, communications network 100 includes a reference signal transmitter 112, e.g., a beacon transmitter, which transmits reference signals utilized by the communications devices (102, 104, 106, 108, 110) in its vicinity to obtain timing synchronization, e.g., in accordance with a peer to peer timing structure being implemented in the network 100.

Figure 2:
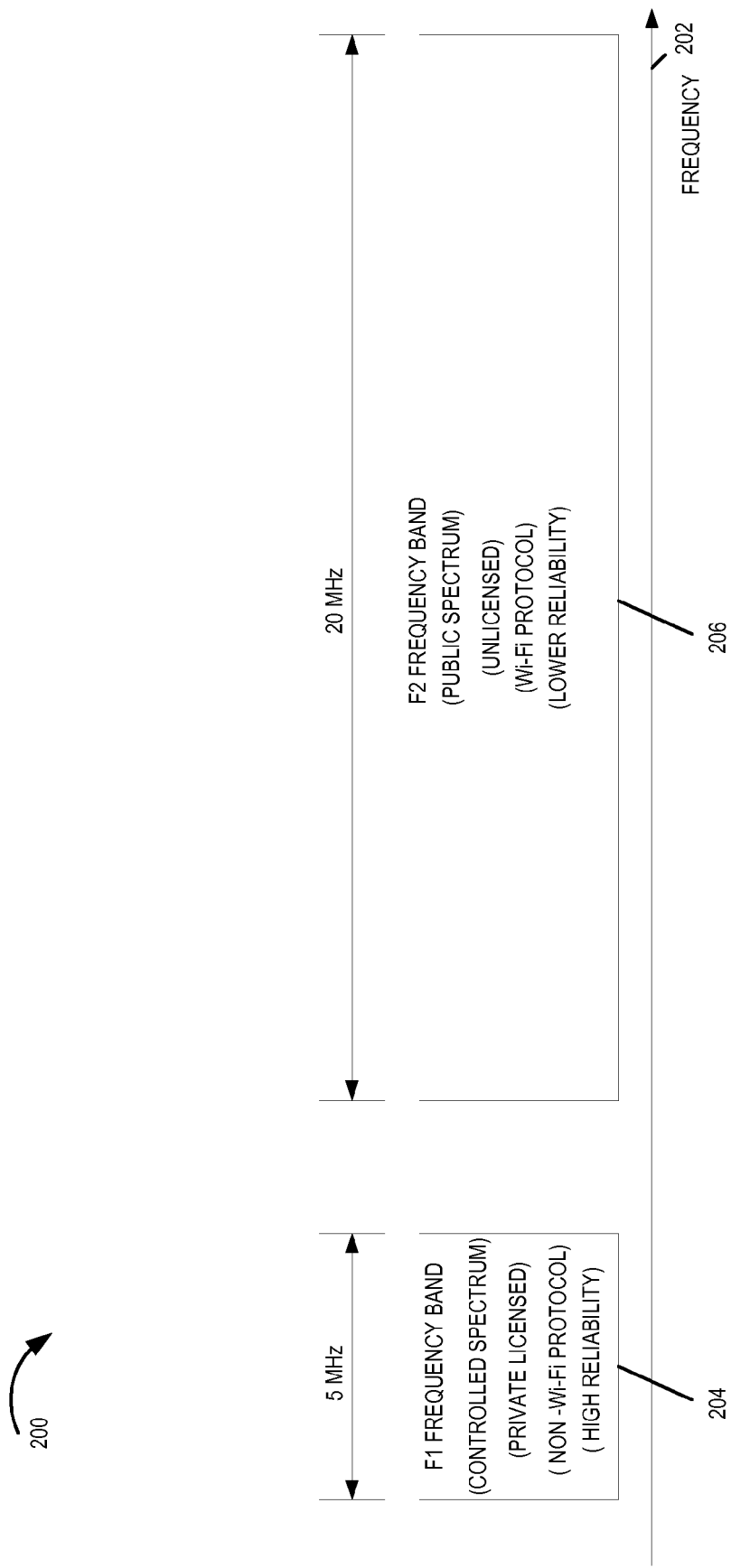
FIG. 2 is a drawing illustrating exemplary spectrum available in the communications network of FIG. 1.

FIG. 2 is a drawing 200 illustrating exemplary spectrum available in the communications network 100 of FIG. 1. Horizontal axis 202 represents frequency. The exemplary available spectrum includes a first frequency band 204, designated the F1 frequency band and a second frequency band 206 designated the F2 frequency band. The first and second frequency bands are non-overlapping. The first frequency band 204 may be a 5 MHz wide controlled frequency band which is privately licensed and which uses a non-Wi-Fi communications protocol. The second frequency band may be a 20 MHz wide public spectrum frequency band which is unlicensed and which uses a Wi-Fi protocol. In general the first frequency band 204 is a higher reliability frequency band than the second frequency band 206.

In some embodiments, additional frequency bands are supported in the communications network, e.g., one or more additional public spectrum unlicensed frequency bands. In some embodiments, different communications bands are available in different regions of the communications network.

Figure 3:
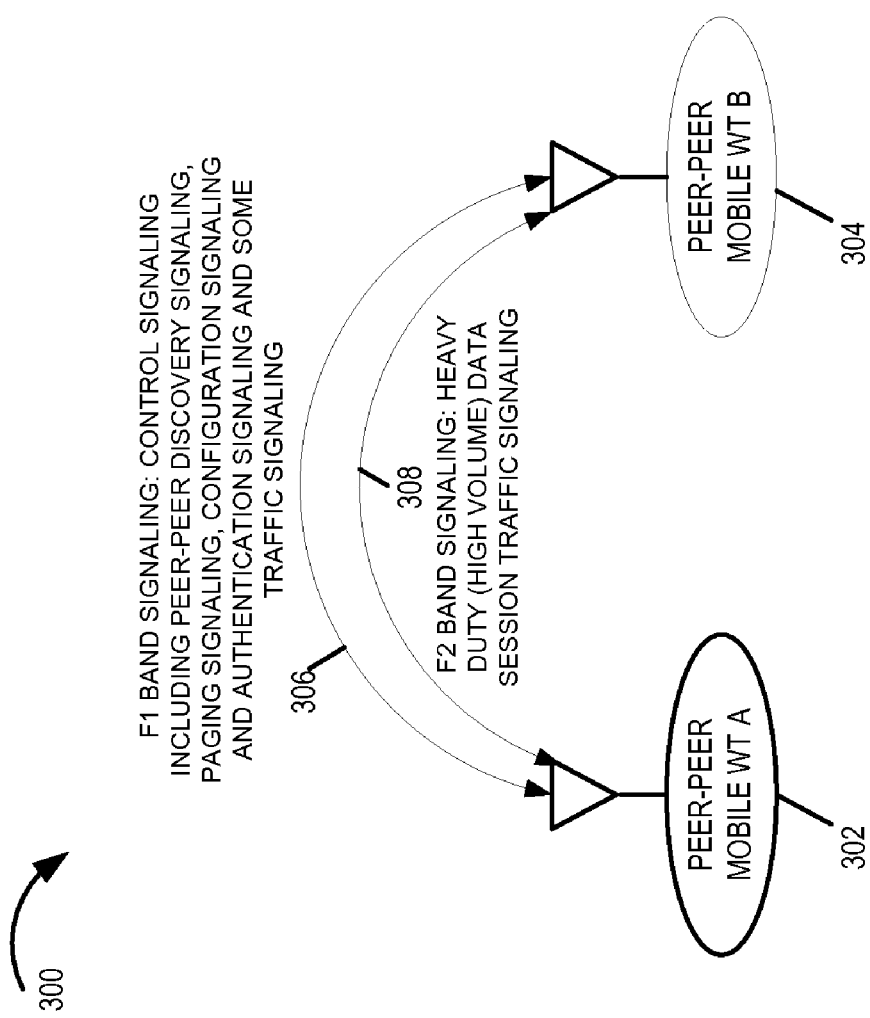
FIG. 3 is a drawing illustrating exemplary signaling exchanged between two peer to peer mobile wireless terminals in accordance with an exemplary embodiment.

FIG. 3 is a drawing 300 illustrating exemplary signaling (306, 308) exchanged between two peer to peer mobile wireless terminals (peer to peer mobile WT A 302, peer to peer mobile WT B 304) in accordance with an exemplary embodiment. WTs (302, 304) are, e.g., any of the communications devices of communications network 100 of FIG. 1.

F1 band signaling 306 includes: (i) control signaling including peer to peer discovery signaling, paging signaling, configuration signaling and authentication signaling and (ii) some traffic signaling. F2 band signaling 308 includes heavy duty, e.g., high volume, data session traffic signaling.

Figure 4:
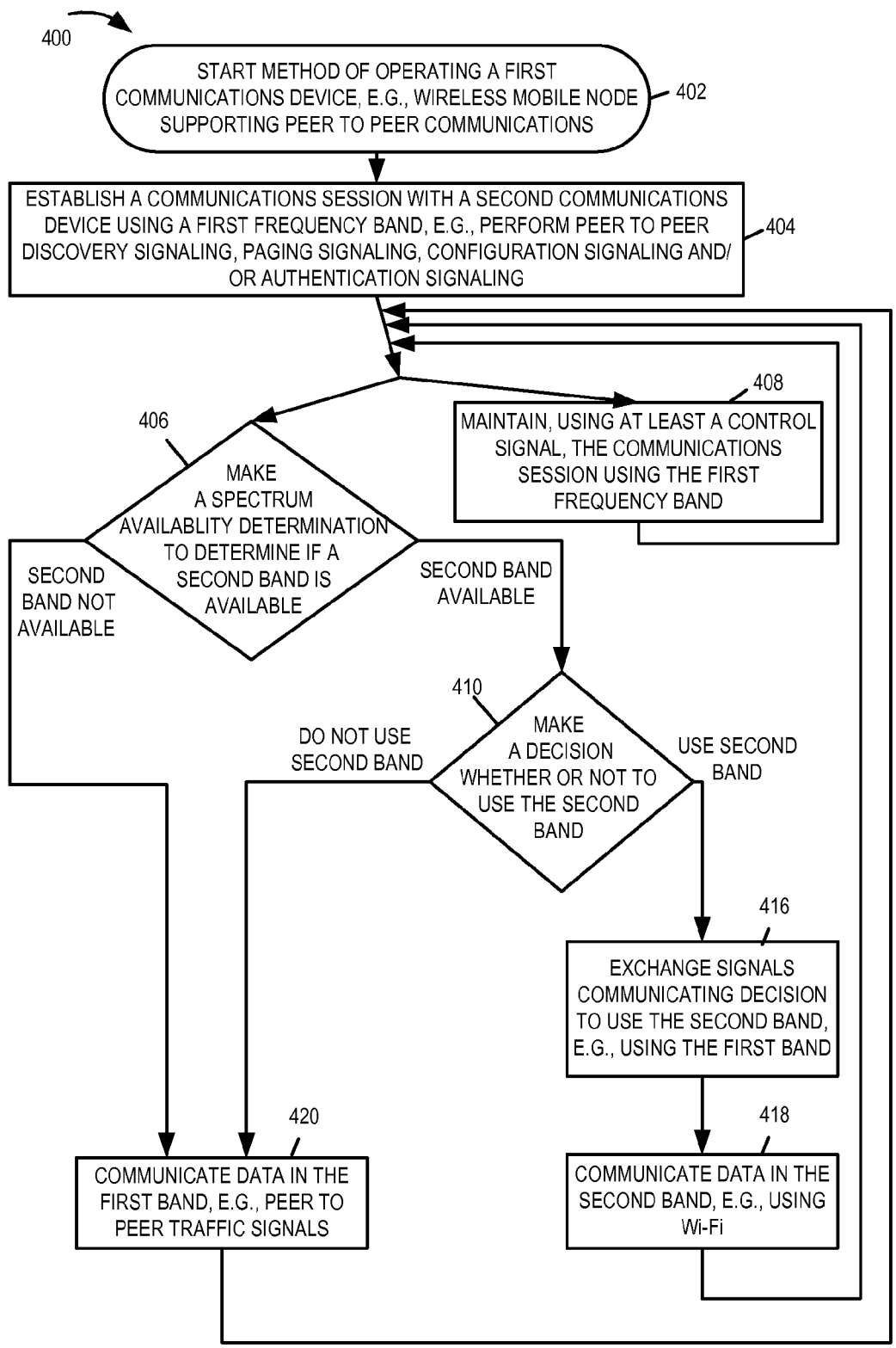
FIG. 4 is a flowchart of an exemplary method of operating a first communications device.

FIG. 4 is a flowchart 400 of an exemplary method of operating a first communications device, e.g., a wireless mobile node supporting peer to peer communications. Operation of the exemplary methods starts in step 402, where the first communications device is powered on and initialized and proceeds to step 404.

In step 404 the first communications device establishes a communications session with a second communications device using a first frequency band. Exemplary operations performed in step 404 include peer to peer discovery signaling, paging signaling, configuration signaling and/or authentication signaling. The first communications band is a privately licensed controlled spectrum frequency band using a non-Wi-Fi protocol such as band 204 of FIG. 2.

Operation proceeds from step 404 to step 406 and 408. In step 406, the communications device makes a spectrum availability determination to determine if a second frequency band is available.

In step 408 the first communications device maintains, using at least a control signal, the communications session using the first frequency band. Step 408 is performed on an ongoing basis.

Returning to step 406, in step 406 if the determination is that a second band is available, then operation proceeds from step 406 to step 410. The second band is, e.g., a public spectrum unlicensed Wi-Fi protocol band such as band 206 of FIG. 2. However, if the determination of step 406 is that a second band is not available, then operation proceeds from step 406 to step 420, where the first communications device communicates data in the first band, e.g., communicates peer to peer traffic signals using the non-Wi-Fi protocol. Returning to step 410, in step 410 the first communications device makes a decision whether or not use the second band. The decision, in some but not necessarily all embodiments, is based on one or more of the following values measured in the second bandwidth: measured SINR, measured interference power, bandwidth occupancy by other communications pairs, (for example, the number of other communications pairs currently using the second bandwidth, and/or the percentage of time the second bandwidth is busy for traffic transmission), the economic price of using the second bandwidth (e.g., licensed or unlicensed spectrum with unlicensed spectrum normally being considered less costly). In some implementations the first device compares one or more of the measured values with the corresponding measurements made in the first bandwidth and, based on the comparison decides whether or not to use the second band.

If the decision of step 410 is to not use the second band, then operation proceeds from step 410 to step 420. However, if the decision of step 410 is to use the second band, then operation proceeds from step 410 to step 416. In step 416, the first communications device exchanges signals communicating the decision to use the second band. In some embodiments, the signals communicating the decision to use the second communications band are communicated in the first frequency band. Operation proceeds from step 416 to step 418.

In step 418 the first communications device communicates data, e.g., traffic signals, in the second band, e.g., using WiFi protocol. Operation proceeds from step 420 or step 418 to the input of steps 406 and 408.

Figure 5:
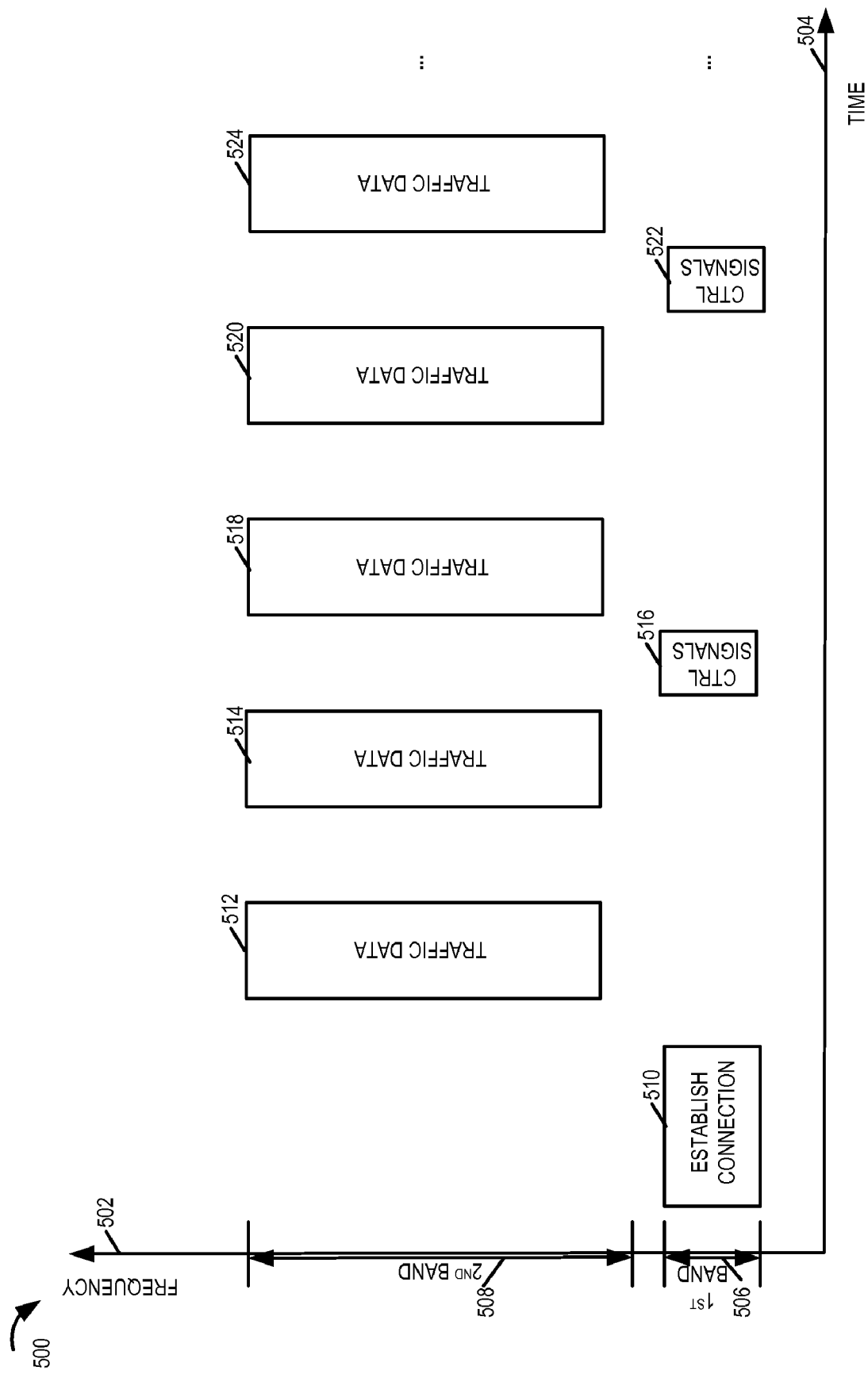
FIG. 5 is a drawing illustrating exemplary air link resources and exemplary signaling for an example where a communications device establishes a connection in a first frequency band and decides to use a second frequency band, while maintaining the connection in the first frequency band.

FIG. 5 is a drawing 500 illustrating exemplary air link resources and exemplary signaling for an example where a first communications device establishes a connection in a first frequency band, e.g., a privately licensed controlled spectrum frequency band and decides to use a second frequency band, e.g., a publicly accessible unlicensed frequency band to communicate traffic data, while maintaining the connection in the first frequency band.

Vertical axis 502 represents frequency while horizontal axis 504 represents time. The frequency spectrum includes a 1st band 506 and a second band 508. First band 506 is, e.g., privately licensed controlled spectrum non-Wi-Fi band 204 of FIG. 2. Second band 508 is, e.g., unlicensed public spectrum Wi-Fi frequency band 206 of FIG. 2. Block 510 illustrates exemplary air link resources of the 1st band 506 and exemplary connection establishment signaling. In this example it may be assumed that the first communications device has determined that the second band is available and has made a decision to use the second communications band. Block 510 may correspond to step 404 signaling and step 416 signaling of flowchart 400 of FIG. 4.

Block 512 illustrates exemplary air link resources of the 2nd band 508 and exemplary communication of traffic signals in the second band. Similarly block 514 illustrates exemplary air link resources of the 2nd band 508 and exemplary communication of traffic signals in the second band. Blocks 512 and 514 may correspond to step 418 of flowchart 400 of FIG. 4.

Block 516 illustrates exemplary air link resources of the 1st band 506 and exemplary control signaling used to maintain the communications session. Block 516 may correspond to step 408 of flowchart 400 of FIG. 4.

Block 518 illustrates exemplary air link resources of the 2nd band 508 and exemplary communication of traffic signals in the second band. Similarly block 520 illustrates exemplary air link resources of the 2nd band 508 and exemplary communication of traffic signals in the second band. Blocks 518 and 520 may correspond to another iteration of step 418 of flowchart 400 of FIG. 4.

Block 522 illustrates exemplary air link resources of the 1st band 506 and exemplary control signaling used to maintain the communications session. Block 522 may correspond to another iteration step 408 of flowchart 400 of FIG. 4.

Block 524 illustrates exemplary air link resources of the 2nd band 508 and exemplary communication of traffic signals in the second band.

Figure 6:
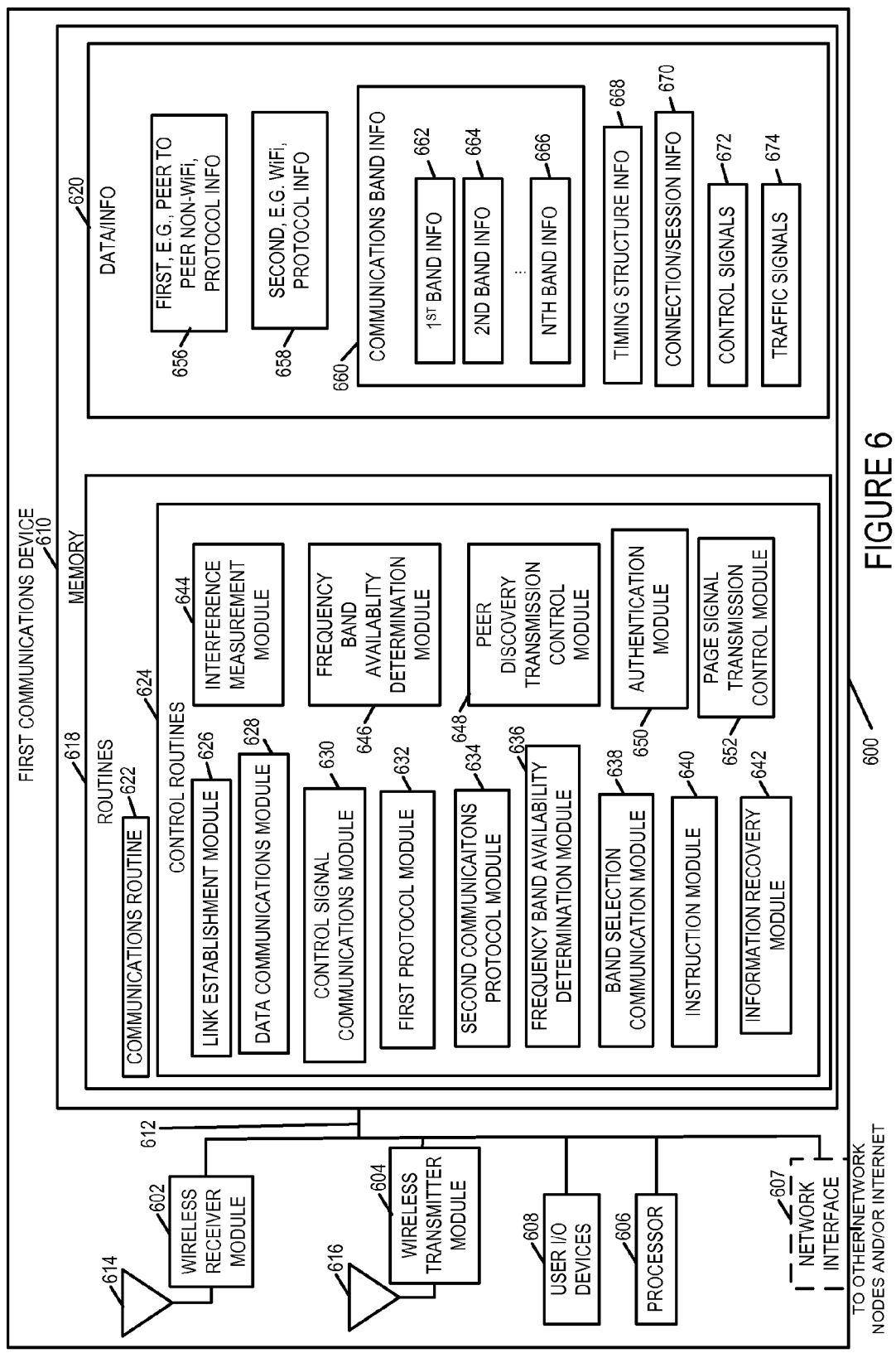
FIG. 6 is a drawing of an exemplary first communication device in accordance with an exemplary embodiment.

FIG. 6 is a drawing of an exemplary first communication device 600, e.g., a wireless terminal such as a mobile node supporting a non-WiFi peer to peer protocol in a first communications band a Wi-Fi protocol in a second communications band. Exemplary first communications device 600 is, e.g., any of the communications devices of communications network 100 of FIG. 1.

Exemplary first communications device 600 includes a wireless receiver module 602, a wireless transmitter module 604, a processor 606, user I/O devices 608, and a memory 610 coupled together via a bus 612 over which the various elements may interchange data and information. In some embodiments, first communications device 610 includes a network interface 607 which is also coupled to bus 612. The network interface 607, when included, provides an interface for coupling the first communications device 600 to network nodes and/or the Internet via a backhaul network.

Memory 610 includes routines 618 and data/information 620. The processor 606, e.g., a CPU, executes the routines 618 and uses the data/information 620 in memory 610 to control the operation of the first communications device 600 and implement methods, e.g., the method of flowchart 400 of FIG. 4 or the method of flowchart 700 of FIG. 7.

Wireless receiver module 602, e.g., an OFDM and/or CDMA receiver, is coupled to receive antenna 614 via which the first communications device 600 receives signals from other devices including e.g., synchronization signals, peer discovery signals, paging signals, configuration signals, authentication signals and traffic signals. Wireless transmitter module 604, e.g., an OFDM and/or CDMA transmitter, is coupled to transmit antenna 616 via which the first communications device 600 transmits signals to other communications devices. Transmitted signals include, e.g., peer discovery signals, paging signals, configuration signals, authentication signals and traffic signals. In some embodiments, the same antenna is used for transmitter and receiver.

Routines 616 include a communications routine 622 and control routines 624. Communications routine 622 implements some of the communications protocols used by the first communications device 600. Control routines 624 includes a link establishment module 626, a data communications module 628, a control signal communications module 630, a first protocol module 632, a second communications protocol module 634, a frequency band availability determination module 636, a band selection communication module 638, an instruction module 640, an information recovery module 642, an interference measurement module 644, a frequency band availability determination module 646, a peer discovery transmission control module 648, an authentication module 650 and a page signal transmission control module 652.

Data/information 620 includes first protocol information, e.g., peer to peer non-Wi-Fi protocol information, and second protocol information, e.g., WiFi protocol information. Data/information 620 also includes communications band information 660, timing structure information 668, connection/session information 670, control signals 672 and traffic signals 674. The communications band information 660 includes information corresponding to a plurality of different bands (1st band information 662, 2nd band information 664, . . . , Nth band information 666). At least one of the plurality of communications bands is a privately licensed controlled spectrum and at least one of the communications bands is a unlicensed public spectrum communications band.

Link establishment module 626 establishes, during a first time interval, a communications link with a second communications device using a first frequency band. Data communications module 628 controls the first communications device 600 to communicate data between the first communications device and the second communications device using a second frequency band in a second time interval following the first interval, said first and second frequency bands being non-overlapping frequency bands. In some embodiments, the first frequency band is a privately licensed frequency band and the second frequency band is an unlicensed frequency band which is publicly accessible.

Control signal communications module 630 control the first communications device 600 to communicate a control signal between the first communications device and the second communications device using the first frequency band during the second time interval. For example, with respect to the example of FIG. 5, the first time interval is an interval including block 510, while the second time interval is an interval including blocks 512, 514, 516, 518, 529, 522 and 524.

First protocol module 632, using first protocol information 656, supports communications in the first frequency band. Second communications protocol module 634, using second protocol information 658, supports communication in the second frequency band. In some embodiments, the second communications protocol module 634 is a WiFi communications protocol module which supports WiFi based communications.

Frequency band availability determination module 636 determines, prior to communicating data using the second frequency band, if the second frequency band is available for data communications. Band selection communications module 638 controls the sending of a signal to the second communications device, using the first frequency band, indicating that the second frequency band is to be used for communicating data.

Instruction module 640 generates an instruction to the second communications device, prior to communicating to the second communications device that the second frequency band is to be used for communicating data, the instruction indicating that the second device is to check the availability of the second frequency band. In some embodiments, both first communications device 600 and the second communications device perform checks as to the availability of the second frequency band, and the second frequency band is not used if either of the checks determines that the second is unavailable.

Information recovery module 642 recovers from a signal received from the second device information indicating the availability status of the second frequency band.

Interference measurement module 644 measures an interference level present in the second frequency band. Frequency band availability determination module 646 makes a frequency band availability determination as a function of an interference level measured by the interference measurement module 644. In various embodiments, the interference measurement module 644 measures one of: i) a received interference power level and ii) a communications load level.

Peer discovery transmission control module 648 controls the wireless transmitter module 602 to transmit peer discovery signals, e.g., in the first frequency band in accordance with a peer to peer timing structure. Authentication module 650 controls generation of authentication signals to be transmitted and the processing of received authentication signals, e.g., in the first frequency band. Page signal transmission control module 652 controls the transmission of page signals, e.g., in the first frequency band.

Timing structure information includes information corresponding to a peer to peer timing structure, e.g., used in a first frequency band and WiFi timing structure information, e.g., corresponding to a second frequency band. In some embodiments, the timing structure information 688 includes information identifying when the first communications device 600 should be operating in the first frequency band, e.g. to support control signaling.

Connection/session information 670 includes information identifying an established current connection and/or current session of first communications device 600, e.g., information identifying connection identifiers currently associated with first communications device 600 and/or air link resources currently associated with first communications device 600. Control signals 672 include, e.g., session establish signals, session maintenance signals, paging signals, configuration signaling authentication signals, band availability signals, band availability instruction signals, and band usage decision signals.

Traffic signals 674 include signals conveying user data to a peer device with which first communications device 600 has a current connection. The user data includes, e.g., image data, voice data, other audio data, text data, and/or other file data, etc. Traffic data signals may be communicated via a second band using a second, e.g., WiFi protocol, or via a first band using a peer to peer non-Wi-Fi protocol. In various embodiments, different coding schemes, rates, and/or data block sizes are used in the different communications bands with regard to traffic signaling.

Figure 7A:
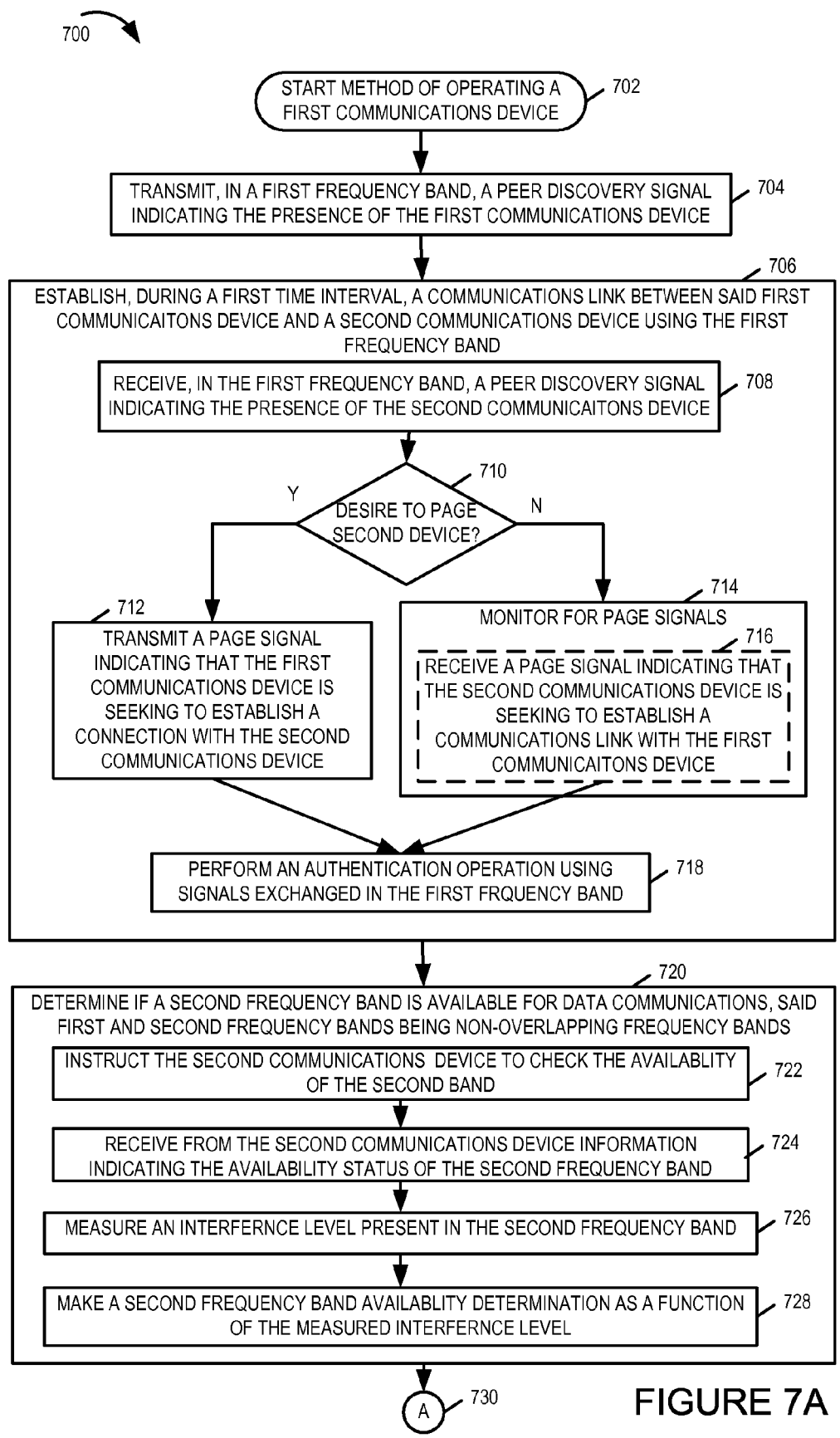
FIG. 7, comprising the combination of FIG. 7A and FIG. 7B, is a flowchart of an exemplary method of operating a first communications device in accordance with an exemplary embodiment.
Figures 7, 7B:
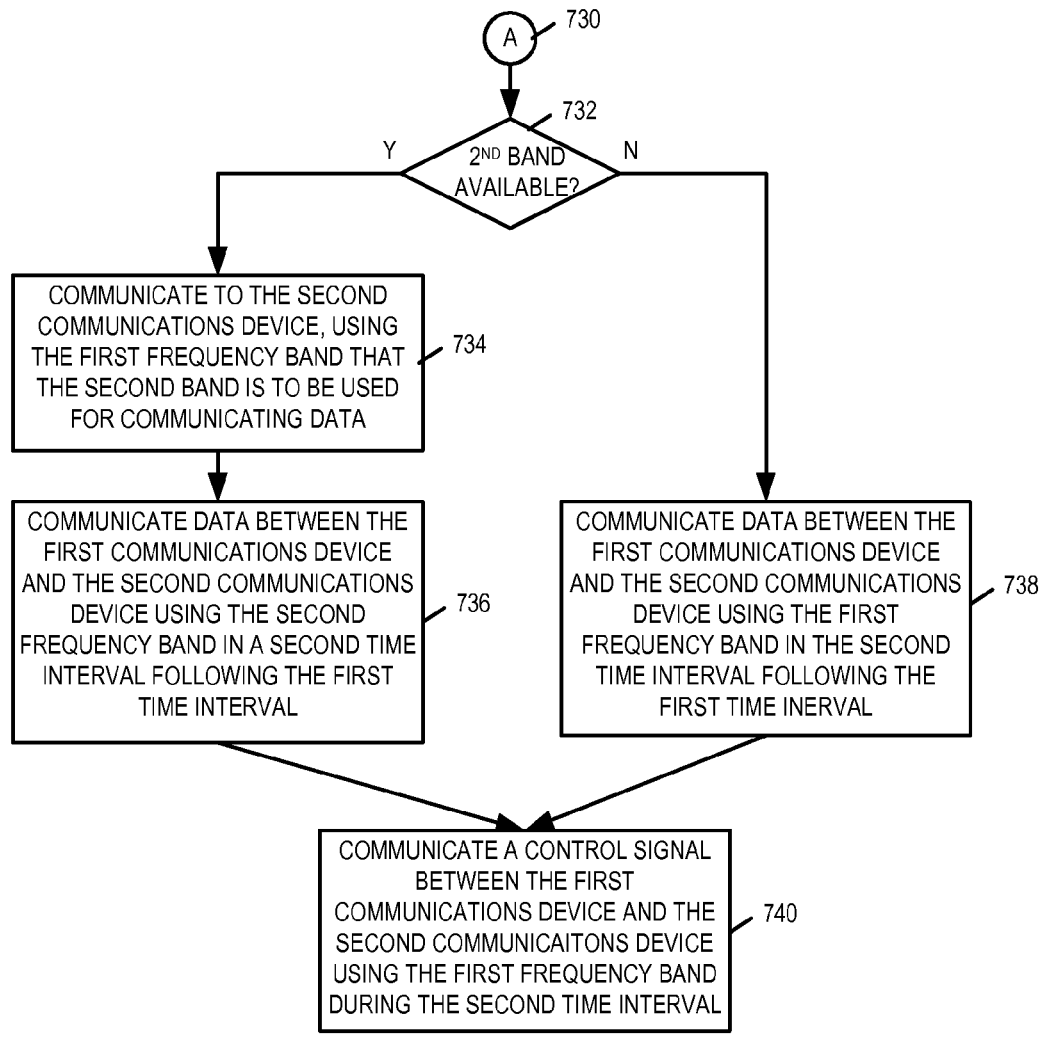

FIG. 7 is a flowchart 700 of an exemplary method of operating a first communications device, e.g., a mobile wireless terminal supporting peer to peer communications, in accordance with an exemplary embodiment. Operation of the exemplary method starts in step 702, where the first communications device is powered on and initialized. Operation proceeds from starts step 702 to step 704. In step 704, the first communications device transmits, in a first frequency band, a peer discovery signal indicating the presence of the first communications device. Operation proceeds from step 704 to step 706.

In step 706 the first communications device establishes, during a first time interval, a communications link between said first communications device and a second communications device using the first frequency band. Step 706 includes sub-steps 708, 710 712, 714 and 718. In sub-step 708 the first communications device receives, in the first frequency band, a peer discovery signal indicating the presence of the second communications device. Operation proceeds from sub-step 708 to sub-step 710.

In sub-step 710 the first communications device decides whether or not it wants to page the second communications device. If the first communications device desires to page the second communications device, then operation proceeds from sub-step 710 to sub-step 712; otherwise, operation proceeds from sub-step 710 to sub-step 714.

Returning to sub-step 712, in sub-step 712 the first communications device transmits a page signal indicating that the communications device is seeking to establish a connection with the second communications device. Operation proceeds from sub-step 712 to sub-step 718.

Returning to sub-step 714, in sub-step 714 the first communications device monitors for page signals. At times, sub-step 714 includes sub-step 716 in which the first communications device receives a page signal indicating that the second communications device is seeking to establish a communications link with the first communications device. Operation proceeds from sub-step 716 to sub-step 718.

In sub-step 718 the first communications device performs an authentication operation using signals exchanged in the first frequency band. Operation proceeds from step 706 to step 720.

In step 720 the first communications device determines if a second frequency band is available for data communications, said first and second frequency bands being non-overlapping frequency bands. In some embodiments, the first frequency band is a privately licensed frequency band and the second frequency band is an unlicensed frequency band which is publicly accessible. Step 720 includes sub-steps 722, 724, 726 and 728. In sub-step 722 the first communications device instructs the second communications device to check the availability of the second frequency band. Operation proceeds from sub-step 722 to sub-step 724 in which the first communications device receives from the second communications device information indicating the availability status of the second frequency band.

Operation proceeds from sub-step 724 to sub-step 726 in which the first communications device measures an interference level present in the second frequency band. Then in sub-step 728 the first communications device makes a second frequency band availability determination as a function of the measured interference level. In some embodiments, the interference level is one of: i) a received interference power level and ii) measured load level. In some embodiments, the interference level is based on a combination of measured received interference power and measured load.

In some embodiments, the first communications device and the second communications device check alternative frequency bands in a plurality of possible alternative frequency bands, to determine a set of candidates for the second frequency band, e.g., based on an interference estimation being below a threshold. In some embodiments the first communications device and the second communications device each form a list of acceptable candidates for the second frequency band. In some embodiments, each acceptable candidate frequency band is associated with a quality indicator value, e.g., a measure of expected interference. In one such embodiment, candidate information and, optionally, quality indicator information, is communicated from at least one of the first communications device and the second communications device to the other one of the first communications device and the second communications device. Then, a second frequency band determination is made as a function of the information from the two lists, e.g., selecting a band that is acceptable to both the first communications device and the second communications device.

Operation proceeds from step 720 via connecting node A 730 to step 732. In step 732 if the determination of step 720 is that a second frequency band is available, then operation proceeds from step 732 to step 734. However, if the determination of step 720 is that a second frequency band is not available, then operation proceeds from step 732 to step 738.

Returning to step 734, in step 734, the first communications device communicates to the second communications device, using the first frequency band, that the second frequency band is to be used for communicating data, e.g., traffic data. Operation proceeds from step 734 to step 736, in which the first communications device communicates data between the first communications device and the second communications device using the second frequency band in a second time interval following the first time interval. In some embodiments, a first communications protocol is used to communicate in the first frequency band and a second communications protocol is used to communicate in the second frequency band. In one such embodiment, the first communications protocol is a non-WiFi protocol, e.g., a non-WiFi protocol supporting peer to peer communications, and the second communications protocol is a WiFi protocol.

Returning to step 738, in step 738 the first communications device communicates data between the first communications device and the second communications device using the first frequency band in the second time interval following the first time interval. Operation proceeds from step 736 or step 738 to step 740. In step 740 the first communications device communicates a control signal between the first communications device and the second communications device using the first frequency band during the second time interval.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, establishing, during a first time interval, a communications link between a first communications device and a second communications device using a first frequency band; communicating data between the first communications device and the second communications device using a second frequency band in a second time interval following the first time interval, said first and second frequency bands being non-overlapping frequency bands; and communicating a control signal between the first communications device and second communications device using the first frequency band during the second time interval. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device comprising:

establishing, during a first time interval, a communications link with a second communications device using a first frequency band wherein said first frequency band is a private licensed frequency band;

determining if a second frequency band is available for data communication, wherein said second frequency band is publicly accessible;

communicating to said second communication device, using said first frequency band, that said second band is to be used for communicating data;

communicating data between said communications device and said second communications device using said second frequency band in a second time interval following said first time interval, said first and second frequency bands being non-overlapping frequency bands; and communicating a control signal between said communications device and said second communications device using said first frequency band during said second time interval.

2. The method of claim 1, wherein a first protocol is used to communicate in the first frequency band and a second communications protocol is used to communicate in the second frequency band (example first is non-WiFi protocol; second protocol WiFi).

3. The method of claim 1, further comprising: prior to communicating to said second communications device that said second band is to be used for communicating data,
  instruct the second device to check the availability of the second band; and
  receiving from the second device information indicating the availability status of the second frequency band.

4. The method of claim 1, wherein said availability determination
  includes: measuring an interference level present in the second frequency band; and
  making said availability determination as a function of the measured interference level.

5. The method of claim 4, wherein the interference level is one of: i) a received interference power level and ii) measured load level.

6. The method of claim 1, wherein establishing a communications link includes:
  transmitting, in said first frequency band, a peer discovery signal indicating the presence of said communications device;
  receiving a page signal indicating that the second device is seeking to establish a communications link with said communication device.

7. The method of claim 6, wherein establishing a communications link further includes:
  performing an authentication operation using signals exchanged in said first frequency band.

8. The method of claim 1, wherein establishing a communications link includes:
  receiving, in said first frequency band, a peer discovery signal indicating the presence of said second communications device;
  transmitting a page signal indicating that the first device is seeking to establish a communications link with said second communication device.

9. The method of claim 8, wherein establishing a communications link further includes:
  performing an authentication operation using signals exchanged in said first frequency band.

10. A communications device comprising:
  a link establishment module configured to establish, during a first time interval, a communications link with a second communications device using a first frequency band, wherein said frequency band is a private licensed frequency band;
  a frequency band availability determination module configured to determine, prior to communicating data using a second frequency band, if said second frequency band is available for data communication wherein said second frequency band is an unlicensed frequency band which is publicly accessible;
  a band selection communication module configured to control send a signal to said second communication device, using said first frequency band, indicating that said second band is to be used for communicating data;
  a data communications module configured to control said communications device to communicate data between said communications device and said second communications device using a second frequency band in a second time interval following said first time interval, said first and second frequency bands being non-overlapping frequency bands; and
  a control signal communications module configured to control said communications device to communicate a control signal between said communications device and said second communications device using said first frequency band during said second time interval.

11. The communications device of claim 10, further comprising:
  a first protocol module configured to support communication in the first frequency band and
  a second communications protocol module configured to support communication in the second frequency band, said second communication protocol module being a WiFi communications protocol module which supports WiFi based communications.

12. The communications device of claim 10, further comprising:
  an instruction module configured to generate an instruction to the second communications device, prior to communicating to said second communications device that said second band is to be used for communicating data, that the second device to check the availability of the second band;
  a wireless receiver; and
  an information recovery module configured to recover from a signal received from the second device information indicating the availability status of the second frequency band.

13. The communications device of claim 10, wherein said availability determination module includes:
  an interference measurement module configured to measure an interference level present in the second frequency band; and
  a frequency band availability determination module configured to make a frequency band availability determination as a function of an interference level measured by said interference measurement module.

14. The communications device of claim 13, wherein the interference measurement modules measures one of: i) a received interference power level and ii) a communications load level.

15. The communications device of claim 10, further comprising:
  a wireless transmitter; and
  a peer discovery transmission control module configured to control said wireless transmitter to transmit, in said first frequency band, a peer discovery signal indicating the presence of said communications device; and
  a wireless receiver configured to receive a page signal indicating that the second device is seeking to establish a communications link with said communication device.

16. The communications device of claim 15, further comprising:
  an authentication module configured to perform an authentication operation using signals exchanged in said first frequency band.

17. The communications device of claim 10, further comprising:
  a wireless receiver configured to receive, in said first frequency band, a peer discovery signal indicating the presence of said second communications device; and
  a page signal transmission control module configured to initiate transmission of a page signal indicating that the first device is seeking to establish a communications link with said second communication device.

18. The communications device of claim 17, further comprising:
an authentication module configured to perform an authentication operation using signals exchanged in said first frequency band.

19. A communications device comprising:
means for establishing, during a first time interval, a communications link with a second communications device using a first frequency band, wherein said first frequency band is a private licensed band which is publicly available;
frequency band availability determination means for determining, prior to communicating data using a second frequency band, if said second frequency band is available for data communication, where said second frequency band is an unlicensed frequency ban which is publicly accessible;
band selection communication means for sending a signal to said second communication device, using said first frequency band, indicating that said second band is to be used for communicating data;
means for controlling said communications device to communicate data between said communications device and said second communications device using a second frequency band in a second time interval following said first time interval, said first and second frequency bands being non-overlapping frequency bands; and
means for controlling said communications device to communicate a control signal between said communications device and said second communications device using said first frequency band during said second time interval.

20. The communications device of claim 19, further comprising:
means for supporting communication in the first frequency band using a first non-WiFi communications protocol; and
means for supporting communication in the second frequency band using a WIFI communications protocol.

21. The communications device of claim 19, further comprising:
instruction generation means for generating an instruction to the second communications device, prior to communicating to said second communications device that said second band is to be used for communicating data, that the second device to check the availability of the second band;
wireless receiver means for receiving wireless signals; and
information recovery means for recovering from a signal received from the second device information indicating the availability status of the second frequency band.

22. A computer program product for use in a communications device, the computer program product comprising:
a computer readable medium comprising:
code for causing a computer to control said communications device to establish, during a first time interval, a communications link with a second communications device using a first frequency band, wherein said first frequency band is a private licensed frequency band;
code for determining if a second frequency band is available for data communication, wherein said second frequency band is publicly accessible;
code for communicating to said second communication device, using said first frequency band, that said second band is to be used for communicating data;
code for causing a computer to communicate data between said communications device and said second communications device using a second frequency band in a second time interval following said first time interval, said first and second frequency bands being non-overlapping frequency bands; and
code for causing a computer to cause a control signal to be communicated between said communications device and said second communications device using said first frequency band during said second time interval.

23. The computer program product of claim 22, code for supporting use of a first protocol used to communicate in the first frequency band and code for supporting use of a second communications protocol used to communicate in the second frequency band, said second communications protocol being a WiFi communications protocol.

* * * * *